United States Patent
Volfkovich et al.

(10) Patent No.: US 6,628,504 B2
(45) Date of Patent: Sep. 30, 2003

(54) ELECTRIC DOUBLE LAYER CAPACITOR

(75) Inventors: Yuri M. Volfkovich, Moscow (RU); Pavel A. Shmatko, Moscow Region (RU)

(73) Assignee: C and T Company, Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/150,506

(22) Filed: May 17, 2002

(65) Prior Publication Data

US 2002/0196597 A1 Dec. 26, 2002

Related U.S. Application Data

(63) Continuation-in-part of application No. 09/848,724, filed on May 3, 2001, now Pat. No. 6,466,429.

(51) Int. Cl.[7] ................................................. H01G 9/00
(52) U.S. Cl. ...................................... 361/502; 361/503
(58) Field of Search ................................ 361/502, 503, 361/508–511

(56) References Cited

U.S. PATENT DOCUMENTS

| | | | | |
|---|---|---|---|---|
| 4,888,666 A | * | 12/1989 | Naitoh et al. | 361/512 |
| 6,115,235 A | * | 9/2000 | Naito | 361/303 |
| 6,466,429 B1 | * | 10/2002 | Volfkovich et al. | 361/502 |

* cited by examiner

*Primary Examiner*—Dean A. Reichard
*Assistant Examiner*—Eric Thomas
(74) *Attorney, Agent, or Firm*—Kilpatrick Stockton LLP

(57) ABSTRACT

The present invention is directed to a novel capacitor. The capacitor may be used in electric double layer capacitors. The capacitors include a polarizable electrode including activated carbon and a non-polarizable electrode including lead dioxide and lead sulfate. The capacitors of the present invention provide considerably higher electric capacity, higher durability, and low resistance, while maintaining high conductivity. Additionally, the electrodes may be produced more quickly and inexpensively.

4 Claims, 3 Drawing Sheets

ELECTRIC DOUBLE LAYER CAPACITOR

CROSS REFERENCE TO RELATED APPLICATIONS

This application is a continuation-in-part application of U.S. patent application Ser. No. 09/848,724 now U.S. Pat. No. 6,466,429, filed May 3, 2001.

TECHNICAL FIELD OF THE INVENTION

This invention relates to electrical engineering and to capacitor engineering in particular, and can be used for manufacturing of high capacitance capacitors utilizing the energy of the electric double layer (EDL). EDL capacitors have found their use as backup power sources in systems requiring uninterrupted electric power supply, such as computers, communication devices, digital programmable lathes, continuous production cycles; for electric starting of internal combustion engines, powering the engines of wheelchairs, golf carts, etc.

BACKGROUND OF THE INVENTION

Several electric power storage devices exist in the form of electric double layer (EDL) capacitors, for example, as described in U.S. Pat. No. 4,313,084 (1982) and U.S. Pat. No. 4,562,511 (1985). Such capacitors consist of two porous polarizable electrodes with a porous separator made of a dielectric material between them, and current collectors. A liquid electrolyte, which can be either non-aqueous or aqueous, including an aqueous sulfuric acid solution, is retained in the pores of the electrodes and the separator and also fills some free volume inside the capacitor case. The electric charge is accumulated in the pores on the interface between the electrode material and the electrolyte. Various porous carbonaceous materials are normally used for manufacturing of polarizable electrodes. To increase the capacitance of the electric double layer capacitor, these carbonaceous materials are subjected to prior activation for the purpose of increasing their specific surface area up to 500–3000 $m^2/g$.

EDL capacitors have much higher capacitance than conventional electrostatic and electrolytic capacitors—up to tens or hundreds of farads per gram of active electrode material. However, a disadvantage of these capacitors is their rather low specific energy, which does not exceed 3 Wh/l. This maximum value of specific energy for double-layer capacitors is set with non-aqueous electrolytes, where the maximum voltage values are in the range of 3 to 3.5 V. However, such capacitors permit relatively low discharge and charge currents due to the lower conductivity of the non-aqueous electrolytes. Still lower specific energies, 0.5 to 2 Wh/l, have been achieved by double-layer capacitors employing aqueous electrolytes with maximum voltage value of approximately 0.9 V. When such double-layer capacitors remain under charge for a prolonged period of time (which is often quite long) at voltages higher than 0.9 V, noticeable oxidation, i.e., corrosion, of the positive carbon electrode takes place accompanied by evolution of oxygen and carbon dioxide.

An electric double layer capacitor having only one polarizable electrode made of a carbonaceous material, is described in Patent of Japan, Accepted Application No 2-11008. The other electrode is non-polarizable, i.e., battery type, made of lithium or lithium alloy. The electrolyte is non-aqueous. Such a capacitor has higher specific energy compared to the conventional double-layer capacitor with two polarizable electrodes. However, a drawback of this prototype is the very low charge and discharge current (0.1 to 1 $mA/cm^2$) and, therefore, very low power density due to the use of a non-aqueous electrolyte. Another essential disadvantage of the rechargeable device in question is its very low cycleability—about 100–200 cycles.

An EDL capacitor with only one polarizable electrode made of a fibrous carbonaceous material is described in Patent WO 97/07518 [4]. The other electrode, made of nickel oxide, is non-polarizable. An aqueous solution of alkaline metal carbonate or hydroxide serves as electrolyte. Such a capacitor excels considerably the double-layer capacitors with two polarizable electrodes in both specific energy (up to 12.5 Wh/l) and maximum voltage (1.4 V).

However, this capacitor has a number of shortcomings:
1) Insufficiently high specific energy;
2) High cost, due to the use of large amounts of nickel oxide.

Still another drawback of the EDL capacitors is the gas generation on the electrodes at overcharge, e.g. of oxygen on the positive electrode and/or hydrogen on the negative electrode. This occurs when the evolution potentials of these gases on the corresponding electrodes are reached at overcharge. As a result, the pressure within the capacitor case increases, which can lead to its decompression and even explosion, unless it is equipped with a special pressure relief valve. But even such valves often are not reliable enough to prevent decompression or explosion: they can, for instance, become clogged with dirt, etc. On account of all this, EDL capacitors have a fundamental disadvantage: the possibility of their decompression and even explosion and need of special maintenance. In order to prevent decompression, the end-of-charge voltage is significantly reduced for reinsurance, thus reducing the initial discharge voltage as well. This, in its turn, leads to a considerable decrease in the EDL capacitor specific energy, which is proportional to the difference between the squares of the initial and final discharge voltages.

Application PCT/RU97/00411 relates to an EDL capacitor having lead sulfate as an active mass of the non-polarizable positive electrode.

U.S. Pat. No. 6,195,252 relates to an EDL capacitor having lead dioxide as an active mass of the non-polarizable electrode. The capacitors described in PCT/RU 97/10041 and U.S. Pat. No. 6,195,252 have are advantageous over that described in WO 97/07518 in their considerably higher maximum voltage of 2.1 V and the correspondingly higher values of specific energy.

The capacitors described in PCT/RU 97/0041 and U.S. Pat. No. 6,195,252 have the following common disadvantages: high cost, insufficient cycle life, and average values of specific energy of up to 40 Wh/l.

The capacitor described in U.S. Pat. No. 6,195,252 is considered hereafter as the closest in terms of both design and performance to the one described in the present invention.

SUMMARY OF THE INVENTION

The objects of the present invention are to increase the cycle life and specific energy of the capacitor and to reduce its cost.

These objects are achieved by the invention described below. In accordance with the invention, a capacitor is provided, which comprises a polarizable electrode made of a porous carbon material, a non-polarizable electrode based on lead sulfate and lead dioxide as active components, and an aqueous solution of sulfuric acid as electrolyte, whereas the mass ratio of any of the active components to their sum ranges from 0.1 to 99% by weight.

The following reversible electrochemical reaction takes place during discharge and charge on the positive electrode:

$$PbO_2 + HSO_4^- + 3H^+ + 2e \Leftrightarrow PbSO_4 + 2H_2O \quad (1)$$

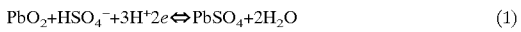

Under the working conditions used, the maximum equilibrium potential of this reaction (which depends on the concentration of the electrolyte) in the charged state is approximately 1.9 V.

During cycling, the EDL on the negative electrode is recharged. The recharge of the EDL can be described as follows:

$$(H^+)_{ad}/C^- + HSO_4^- \Leftrightarrow H^+ + (HSO_4^-)_{ad}/C^+ + 2e^- \quad (2).$$

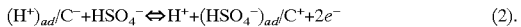

Here the designation $(H^+)_{ad}/C^-$ refers to a proton adsorbed in the EDL on the negatively charged surface of the carbon electrode (for the charged state of the capacitor), and $(HSO_4^-)_{ad}/C^+$ to a bisulfate ion adsorbed in the EDL on the positively charged surface of the carbon electrode (for the discharged state of the capacitor). In our experiments, the potential of said electrode changed in the range from −0.2 to 1.0 V vs. normal hydrogen electrode in the same solution. Thus, during a charge-discharge process the potential changes in the range form −0.6 to +2.1 V.

Combining of equations (1) and (2) gives the overall equation of the electrochemical reaction taking place in the electrical double layer capacitor, described herein:

$$PbO_2 + 2H_2SO_4 + (H^+)_{ad}/C^- \Leftrightarrow PbSO_4 + 2H_2O + (HSO_4^-)^{ad}/C^+ \quad (3)$$

It should be noted that the active mass of the positive electrode contains both lead dioxide and lead sulfate at any degree of discharge. This has been demonstrated by the results of the chemical analysis. As such, at fully charged state the actual mass ratio $PbSO_4/(PbO_2 + PbSO_4)$ is generally not lower than 0.1%, while at fully discharged state it is generally not higher than 99%. Therefore, the requirements on the purity of the active mass as formulated in both PCT/RU 97/0041 and U.S. Pat. No. 6,185,252 are unrealistic, since they envisage the use of pure $PbSO_4$ and pure $PbO_2$, respectively.

The capacitor disclosed herein is considerably (by approximately 30 to 60%) cheaper than those disclosed in PCT/RU 97/0041 and U.S. Pat. No. 6,185,252. This is due to the avoided expenses for purifying the active mass ($PbSO_4$ and $PbO_2$, respectively), which is not necessary according to the present invention. Moreover, the tri-component non-polarizable electrode containing $PbO_2$, $PbSO_4$, and $PbO$ provides better performance of the capacitor.

In a preferred embodiment of the present invention, the non-polarizable electrode contains also lead monoxide, PbO, ranging from 0.2 to 5% of the mass of the lead sulfate. The addition of this small amount of lead monoxide modifies the structure of the active mass in such a way that the degradation of the porous structure of said electrode is diminished at not very small currents. For best performance, not only ideal reversibility of the electrochemical processes in the capacitor is necessary, but also ideal reversibility of the changes in the porous structure of the positive electrode. In practice, however, during multiple cycling the porous structure gradually degrades. This brings about decrease in the capacity of said electrode and corresponding decrease in the capacity and specific energy of the capacitor as a whole.

Addition of small amounts of PbO slows down the degradation processes at not very low currents. As a result, the cycle life increases by 20 to 30%. When the cycle number is equal, the specific energy increases.

In another preferred embodiment of the present invention, the polarizable electrode contains a small amount of lead in addition to the carbon. The desirable lead content of the polarizable electrode ranges from 0.03 to 3% by weight. The addition of small quantities of lead to the active mass of the polarizable electrode causes significant increase in its capacity (by 100–300 F) due to changes in the surface groups and improved hydrophilization of the carbon surface, and thereby, to increase in the working surface of this electrode. Furthermore, by considerably lowering the rate of several electrochemical reactions responsible for electrolyte decomposition, the lead additive reduces the leakage currents and extends the cycle life of the capacitor.

In still another preferred embodiment of the present invention, the non-polarizable electrode contains also lead phosphate, $Pb_3(PO_4)_2$, ranging from 0.1 to 5% of the active mass. Such small addition of lead phosphate reduces the sulphation rate of said electrode and diminishes guttering, thereby improving the cycleability by 20–50%.

The implementation of the present invention results in higher by far specific capacity, specific energy and cycle life, as well as in much lower cost.

An important advantage of the capacitor disclosed herein over a lead-acid battery is that the former is more adaptive to complete sealing. This arises from two main reasons:

1. Even at minimum potential of the carbon electrode ($E_c = -0.2$ V vs. hydrogen electrode in the same solution), which is reached at end of charge, hydrogen is not generated due to the high overpotential of hydrogen evolution on carbon, especially when small amount of lead is present in the carbon electrode.
2. Oxygen that can be generated at end of charge on the positive electrode can be fully reduced on the negative electrode since the activated carbon has good catalytic ability for this process, especially when the very high maximum polarization of 1.4 V is taken into account. Activated carbon, for instance, is applied for electroreduction of oxygen in fuel cells [Bagotsky V. S., Skundin A. M., Chemical Current Sources, Energy, 1981]. Thus, there is no need of additives such as platinum, palladium, etc., which facilitate burning of oxygen and hydrogen in some lead-acid cells [Patent of Japan, Accepted Application No. 60-35475], thereby enabling the sealing of the latter.

The numbers on the Figures designate the following features:
1—pressure cover of the capacitor case; 2—insulator; 3—metal current collector; 4—the current collector protective layer made of graphite foil; 5—negative polarizable porous carbon electrode soaked with electrolyte; 6—electron nonconductive separator soaked with electrolyte; 7—positive electrode made of lead sulfate and lead dioxide soaked with electrolyte; 8—acid-resistant sealant; 9 pressure-resistant case.

EXAMPLES

Example 1

Figure 1:
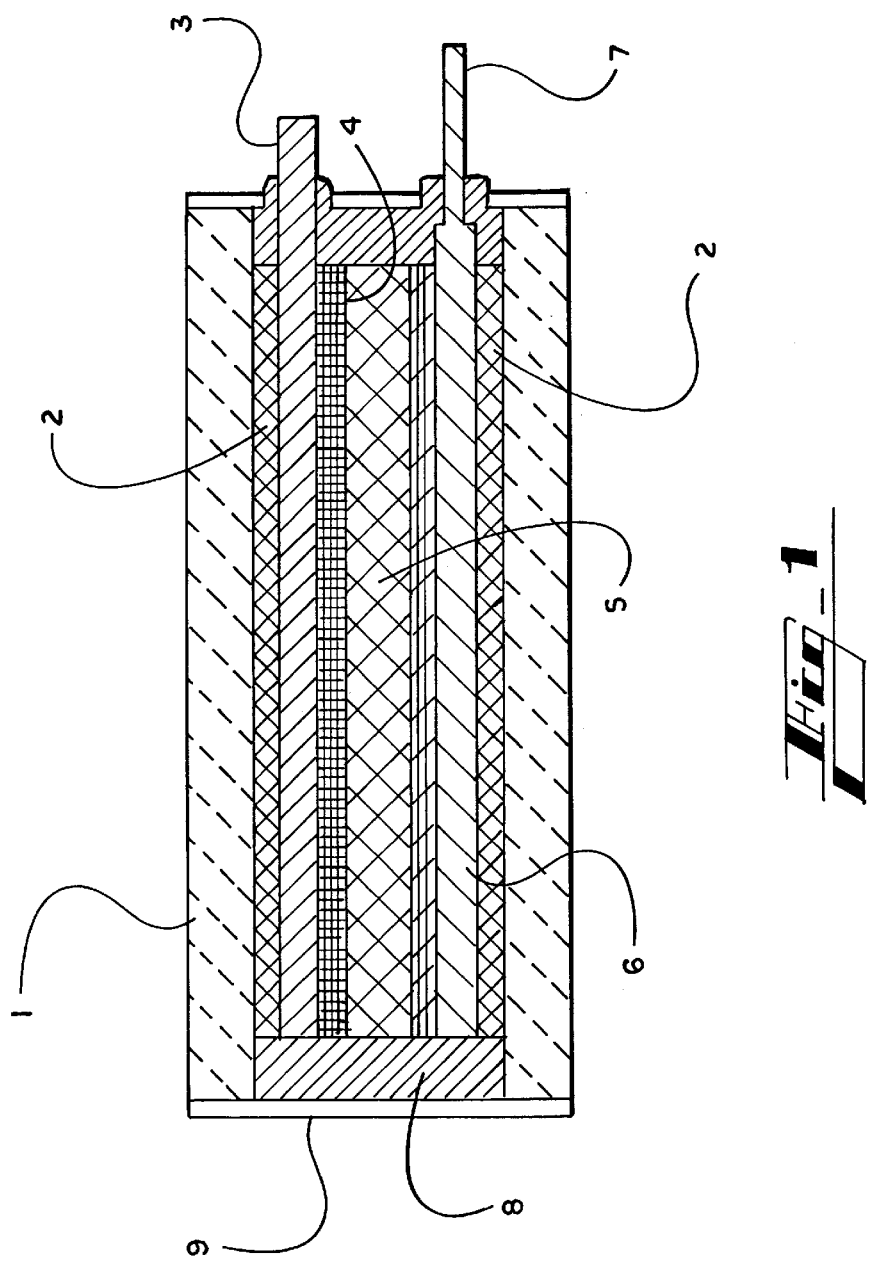
FIG. 1 represents a version of a capacitor assembled in accordance with the present invention.

A sealed electric double layer capacitor (FIG. 1), comprising a negative electrode 5 in the form of 8 layers of activated carbon fabric of the TCA type having specific surface area of 1200 m$^2$/g and thickness of 300 μm each; a 1 mm-thick positive electrode 7, with active mass containing lead sulfate and lead dioxide, pressed into a grid made of an alloy containing 94% lead and 5% antimony; a Grace-type porous separator 6; a pressure cover of the case 1; an insulator 2 preventing short-circuiting between the capacitor electrodes; current collectors 3 made of sheet steel; a current collectors protective corrosion-resistant layer 4 made of graphite foil; an acid-resistant sealant 8; and a pressure-resistant case 9.

According to the chemical analysis, the content of the positive electrode active mass in discharged state was 77.3% PbSO$_4$, 1.9% PbO, and 20.8% PbO$_2$, while in the charged state it was 3.32% PbSO$_4$, 0.06% PbO, and 96.62% PbO$_2$. Therefore, the mass ratio of the lead sulfate to the total mass of PbSO$_4$ and PbO$_2$ was in the range from 78.80% to 3.44%, the mass ratio of the lead dioxide to the total mass of PbSO$_4$ and PbO$_2$ was in the range from 21.20% to 96.68%, and the lead oxide to lead sulfate mass ratio ranged from 2.46% to 1.80%.

In discharged state, the porous electrodes and separator are soaked with electrolyte, an aqueous solution of sulfuric acid having density of 1.1 g/cm$^3$. Both electrodes are plate-shaped, with dimensions of 76×74 mm. The compression pressure on the electrodes and the separator between the case walls is 10 kg/cm$^2$. The electrolyte is hold only in the pores of the electrodes and the separator. The values of the electrolyte-free portions of the pore volume, measured by weighing, were 36% for the negative electrode, 21% for the positive electrode, and 11.5% for the separator.

During testing, the following values were obtained: maximum voltage 2.1 V; specific energy 56.2 Wh/l (at discharge current of 0.2 A); number of charge-discharge cycles 6800 (the tests continued after this value was reached); internal resistance of the capacitor 5.8 mΩ; charging time 16 min; maximum extra gas pressure within the case 0.01 atm. This pressure is so low, that decompression of the capacitor described herein is impossible.

Example 2

Figure 2:
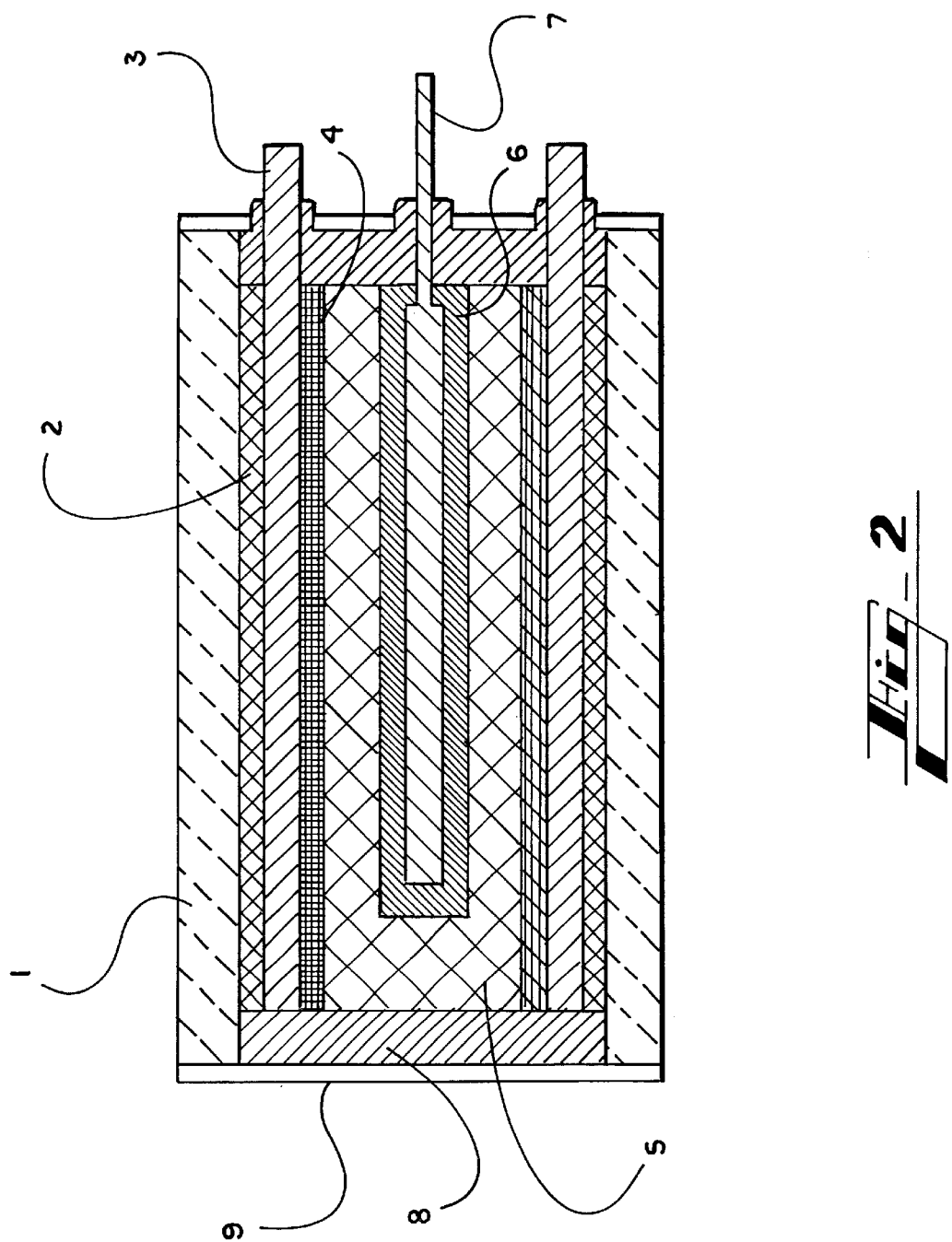
FIG. 2 represents another version of capacitor assembly according to the present invention.

An electric double layer capacitor (FIG. 2) differing from the capacitor described in Example 1 (FIG. 1) in that in this case, two negative electrodes were employed made each of 4 layers of TCA-type activated carbon fabric (with specific surface 1200 m$^2$/g and layer thickness 300 μm), positioned on both sides of the positive electrode and interconnected. The positive non-polarizable electrode 7 consisted of a grid made of an alloy containing 94% lead and 5% antimony, and a paste comprising 83% active mass and 17% polytetrafluorethylene applied into the grid openings. According to the chemical analysis, at fully charged state the mass ratio of the lead sulfate to the total mass of PbSO$_4$ and PbO$_2$ was 1.9%, the mass ratio of the lead dioxide to the total mass of PbSO$_4$ and PbO$_2$ was 98.1%, and the lead oxide to lead sulfate mass ratio was 0.15%. A Grace-type separator 5 was employed. The current collectors 3 were made of sheet stainless steel. The current collectors corrosion-resistant protective layer 4 was made of a non-porous, 0.3-mm thick graphite-based carbon material. Both electrodes were plate-shaped, 76×74 mm in size. A sulfuric acid electrolyte with initial density 1.1 g/cm$^2$ (at discharged state of the capacitor) was used in this example. The compression pressure of 10 kg/cm$^2$ was employed on the electrodes. The electrolyte was contained only in the pores of the electrodes and the separator. The values of the electrolyte-free portions of the pore volume, measured by weighing, were 29% for the negative electrode, 19% for the positive electrode, and 10.5% for the separator. The capacitor was vacuumized prior to assembly.

Figure 3:
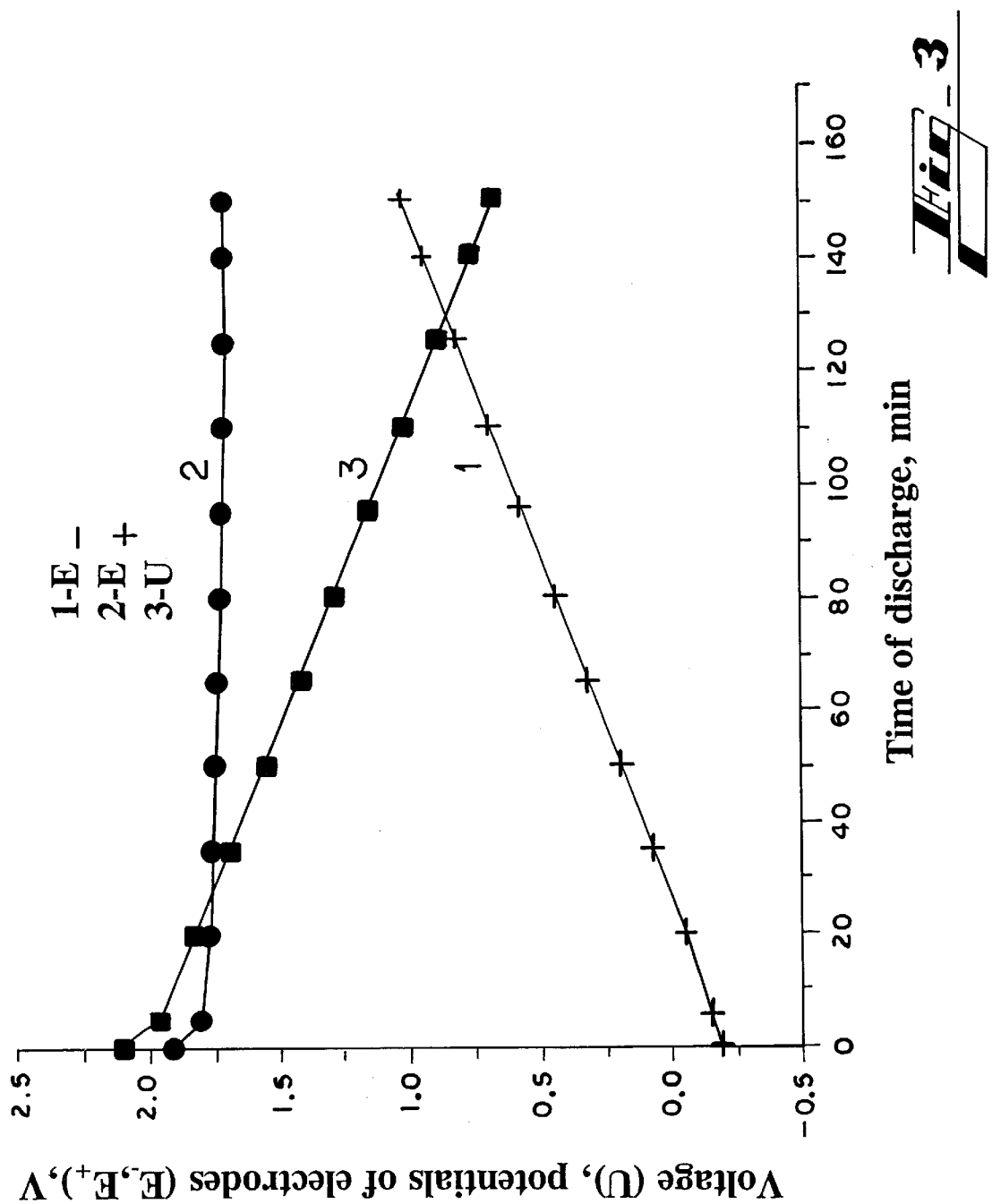
FIG. 3 illustrates the dependence between the voltage (U) at the capacitor terminals and the potentials of the negative ($E_-$) and positive ($E_+$) electrode on the discharge time.

FIG. 3 illustrates the relationship between the voltage (U) on the capacitor terminals and the potentials of the negative (E_) and positive (E$_+$) electrode, on one hand, and the discharge time, on the other. The discharge curves were measured at temperature of 20° C. and current of 0.5 A. The electrode potentials are given vs. normal hydrogen electrode in the same solution.

From the drawing described, the following conclusions could be made: 1) the potential of the positive electrode exhibits but insignificant decrease during the discharge process; 2) the potential of the negative electrode increases almost linearly during the process; 3) as a result, the discharge curve in the voltage range below 1.85 V is almost linear, which is characteristic of capacitors; 4) the maximum voltage (U$_{max}$) is approximately 2.1 V.

Since the oxidation rate of the carbon electrodes is considerable at potentials higher than 1 V, the minimum discharge voltage U$_{min}$ is achieved when (E_)$_{max}$=1.0 V. In FIG. 3, one can see that for the capacitor in question, U$_{min}$=0.7 V.

The following results were obtained during testing: specific energy 58.9 W*hr/l at 0.5-A discharge current; number of charge-discharge cycles 7120 (the tests continued after this value was reached); internal resistance 5.1 mΩ; charging time 15 min.; maximum extra gas pressure within the case 0.008 atm, which is too low to cause decompression.

Examples 1 and 2 show that the capacitors disclosed herein have several times higher specific energy than those described in U.S. Pat. No. 4,313,084 and U.S. Pat. No. 4,562,511: 58.9 Wh/l compared to 2 Wh/l at most. As FIG. 3 displays, this is related to two main reasons:

1. Considerably higher value of the maximum discharge voltage, U$_{max}$.
2. Virtual independence of the potential of the positive electrode on discharge time.

When compared to the capacitor described in Patent of Japan, Accepted Application No. 2-11008, the capacitor disclosed herein excels in both current densities, which at sufficient specific energy reach ~100 mA/cm$^2$, and cycle life, extending 6800 cycles.

The capacitor disclosed herein has several advantages over that described in Patent WO 97/07518 as well:

1. A considerably higher value of the maximum discharge voltage U$_{max}$=2.1 V, as compared to 1.4 V for the prototype. Due to the squared dependence of the capacitor power (W) from the voltage $$W=(C/2)[(U_{max})^2-(U_{min})^2] \qquad (4),$$

where C is the capacitance, such a gain in voltage results in a substantially higher gain in specific energy.

2. Since the conductivity of the sulfuric acid electrolyte is much higher than that of the alkaline one, this results in an additional gain in the specific properties in comparison to the prototype.

Example 3

An electric double layer capacitor is provided having the same content of the positive electrode as in Example 1, but differing from the latter in the following:

1. The polarizable electrode was made of activated carbon 210C (Bamebey-Sutcliffe) and 10% polyethylene binder instead of activated carbon fabric. The electrode was formed by pressing.
2. The polarizable electrode contained also 1.45% by weight of fine-dispersed lead.

The following results were obtained during testing: specific energy of 64.6 Wh/l at 0.2 A; maximum voltage 2.14 V; number of charge-discharge cycles 8500 (the tests continued after this value was reached); internal resistance 5.1 m$\Omega$; charging time 16 min.; maximum extra gas pressure within the case 0.011 atm, which is too low to cause decompression. Insertion of small amount of lead into the polarizable electrode brought about increase in the specific capacity and improved the cycle life due to inhibition of some electrochemical reactions causing electrolyte decomposition and leakage current by the lead. The above-mentioned characteristics of the capacitor disclosed herein are superior to those described in PCT/RU 97/0041 and U.S. Pat. No. 6,185,252.

Example 4

An electric double layer capacitor is provided having the same content of the positive electrode as in Example 1 with the only exception of adding lead phosphate powder amounting 3.75% of the active mass. The following results were obtained during testing: specific energy of 61.5 Wh/l; maximum voltage 2.10 V; number of charge-discharge cycles 9460 (the tests continued); internal resistance 4.1 m$\Omega$; maximum extra gas pressure within the case 0.012 atm, which is too low to cause decompression. Analyses confirmed that such improvement in the cycleability compared to the previous cases was due to diminished sulfation and shedding of the positive electrode. This was ascribed to the beneficial influence of the lead phosphate. The above-mentioned characteristics of the capacitor disclosed herein are superior to those described in PCT/RU 97/0041 and U.S. Pat. No. 6,185,252.

As demonstrated, the implementation of the present invention results in higher specific capacity and energy than the EDL capacitors known in the previous art such as these described in WO 97/07518, PCT/RU 97/0041 and U.S. Pat. No. 6,185,252, as well as in improved cycleability and reduced cost. The capacitor disclosed herein allows both series and parallel connections of elements and, therefore, assembling of different combinations of capacitor batteries. Compared with other EDL capacitors described in the previous art, the capacitor disclosed in the present invention is much cheaper, the cost of a Watt-hour being approximately $0.3.

What is claimed is:

1. An electric double layer capacitor comprising:

a polarizable electrode made of a carbonaceous material;

a non-polarizable electrode composed of lead dioxide and lead sulfate; and an aqueous solution electrolyte containing sulfuric acid, wherein the mass ratio of the lead sulfate and lead dioxide to their total mass being in the range from 0.1 to 99% by weight, and the polarizable electrode contains also lead.

2. The capacitor of claim 1, wherein the portion of the lead in the active mass of the polarizable electrode ranges between 0.03 and 3% by weight.

3. The capacitor of claim 1, wherein the non-polarizable electrode further contains lead monoxide in a mass amount of from 0.2 to 5% of the lead sulfate.

4. The capacitor of claim 1, wherein the non-polarizable electrode further contains lead phosphate in a mass amount of from 0.1 to 5% of the active mass of the electrode.

* * * * *